US00RE42487E

(19) United States
(12) Reissued Patent
May

(10) Patent Number: US RE42,487 E
(45) Date of Reissued Patent: Jun. 28, 2011

(54) CARRIER ASSEMBLY FOR PERCUSSION INSTRUMENTS

(76) Inventor: Randall L. May, Irvine, CA (US)

(21) Appl. No.: 10/948,849

(22) Filed: Sep. 24, 2004

Related U.S. Patent Documents

Reissue of:
(64) Patent No.: 6,770,805
Issued: Aug. 3, 2004
Appl. No.: 10/170,005
Filed: Jun. 10, 2002

U.S. Applications:
(60) Division of application No. 09/756,479, filed on Jan. 8, 2001, now Pat. No. 6,403,869, which is a continuation-in-part of application No. 09/507,800, filed on Feb. 22, 2000, now Pat. No. 6,172,290, which is a division of application No. 09/497,266, filed on Feb. 3, 2000, now Pat. No. 6,329,583, which is a division of application No. 09/497,265, filed on Feb. 3, 2000, now Pat. No. 6,323,407, which is a continuation-in-part of application No. 08/976,999, filed on Nov. 24, 1997, now Pat. No. 6,028,257, which is a continuation-in-part of application No. 08/588,244, filed on Jan. 18, 1996, now Pat. No. 5,691,492.

(51) Int. Cl.
*G10D 13/02* (2006.01)

(52) U.S. Cl. ..... 84/421; 84/104; 84/411 R

(58) Field of Classification Search ..... None
See application file for complete search history.

(56) References Cited

U.S. PATENT DOCUMENTS

| | | | | | |
|---|---|---|---|---|---|
| 3,774,823 | A | * | 11/1973 | Hoellerich | 224/257 |
| 3,974,732 | A | * | 8/1976 | Kester, Jr. | 84/421 |
| 4,102,237 | A | * | 7/1978 | Suess et al. | 84/421 |
| 4,453,446 | A | * | 6/1984 | Hoshino | 84/421 |
| 5,054,357 | A | * | 10/1991 | Pyle | 84/421 |
| 5,140,889 | A | * | 8/1992 | Segan et al. | 84/723 |
| 5,520,292 | A | * | 5/1996 | Lombardi | 211/85.6 |
| 5,691,492 | A | | 11/1997 | May | 84/421 |
| 5,949,008 | A | * | 9/1999 | Augsburger | 84/421 |

OTHER PUBLICATIONS

Remo "Marching & Concert Percussion" Brochure, Copyright 1992.
"Ludwig/Musser Marching Percussion" Brochure, Copyright 1991.

* cited by examiner

*Primary Examiner* — Marlon T Fletcher
(74) *Attorney, Agent, or Firm* — Kirk A. Buhler; Buhler & Associates

(57) ABSTRACT

Novel hardware is disclosed for supporting drums. The hardware is of a hinged construction and has one part of the hinge connectable to an external support, e.g., J-rods on a fixed pedestal support or a marching drum carrier, and another part of the hinge connectable to the shell of a drum or to the tension rods on a drum or to other supporting hardware installed on the drum.

20 Claims, 7 Drawing Sheets

CARRIER ASSEMBLY FOR PERCUSSION INSTRUMENTS

Matter enclosed in heavy brackets [ ] appears in the original patent but forms no part of this reissue specification; matter printed in italics indicates the additions made by reissue.

CROSS REFERENCE TO RELATED APPLICATION

[This application is a division of U.S. patent application Ser. No. 09/756,479, filed Jan. 8, 2001 now U.S. Pat. No. 6,403,869.]

*This application is a reissue of U.S. application Ser. No. 10/170,005 filed on Jun. 10, 2002 now U.S. Pat. No. 6,770,805 issued on Aug. 3, 2004, which is a Division of application Ser. No. 09/756,479 filed Jan. 8, 2001, now U.S. Pat. No. 6,403,869 issued Jun. 11, 2002, which is a Continuation-in-part of U.S. application Ser. No. 09/507,800 filed Feb. 22, 2000, now U.S. Pat. No. 6,172,290 issued Jan. 9, 2001, which is a Division of U.S. application Ser. No. 09/497,266 filed Feb. 3, 2000, now U.S. Pat. No. 6,329,583 issued Dec. 11, 2001, which is a Division of U.S. application Ser. No. 09/497,265 filed Feb. 3, 2000, now U.S. Pat. No. 6,323,407 issued Nov. 27, 2000, which is a Continuation-in-part of U.S. application Ser. No. 08/976,999 filed Nov. 24, 1997, now U.S. Pat. No. 6,028,257 issued Feb. 22, 2000, which is a Continuation-in-part of U.S. application Ser. No. 08/588,244, filed Jan. 18, 1996, now U.S. Pat. No. 5,691,492, issued Nov. 25, 1997.*

BACKGROUND OF THE INVENTION

1. Field of the Invention

This invention relates to new and useful improvements in apparatus for supporting or carrying percussion instruments, particularly drums of various kinds.

2. Brief Description of the Prior Art

The prior art discloses many examples of apparatus for supporting percussion instruments but none providing the combination of features disclosed and claimed herein.

May U.S. Pat. No. 5,691,492 discloses hardware for supporting drums that is of a hinged construction and has one part of the hinge connectable to an external support, e.g., J-rods on a fixed support or a marching drum carrier, and another part of the hinge connectable to the shell of a drum or to the tension rods on a drum or to other hardware on the drum.

May U.S. Pat. No. 6,028,257 shows drum hardware and drums secured thereon preferably supported on a vest type carrier or a T-bar carrier or a fixed post or pedestal.

May U.S. Pat. No. 6,172,290 shows a hinged support for an array of drums.

Other possibly relevant prior art is Pyle U.S. Pat. No. 5,054,357; May U.S. Pat. No. 5,072,910 and May U.S. Pat. No. 5,300,810.

SUMMARY OF THE INVENTION

One of the objects of this invention is to provide a new and improved hinged support for an array of drums for support on a pedestal or marching type carrier.

Another object of the invention is to provide a new and improved hinged support for an array of drums for support on a pedestal or marching type carrier having means for adjusting the position of a drum array relative to fixed drums thereon.

Another object of the invention is to provide a new and improved hinged support for an array of drums for support on a pedestal or marching type carrier having novel means for supporting the drums thereon.

Another object of the invention is to provide a new and improved hinged support for drums for support on a pedestal or marching type carrier by J-rod supports.

Another object of the invention is to provide a new and improved means for connecting a hinged support for an array of drums for support on individual drums.

Other objects of the invention will become apparent throughout the specification and claims as hereinafter related.

DESCRIPTION OF PRIOR ART SUPPORTS FOR THE DRUM SUPPORTING HARDWARE OF THIS INVENTION

Figure 1:
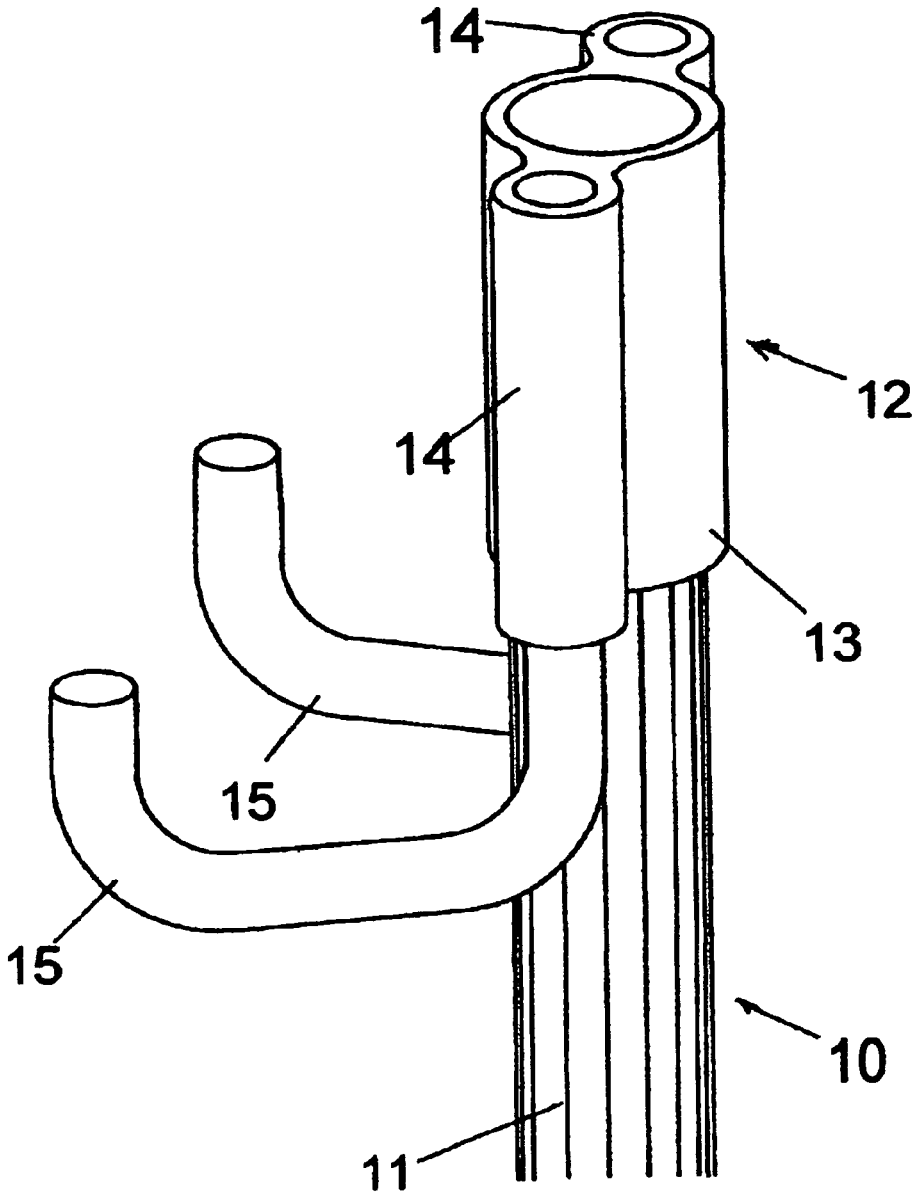
FIG. 1 is an isometric view of a pedestal support and J-bars for supporting a drum and supporting hardware as described below.
Figure 2:
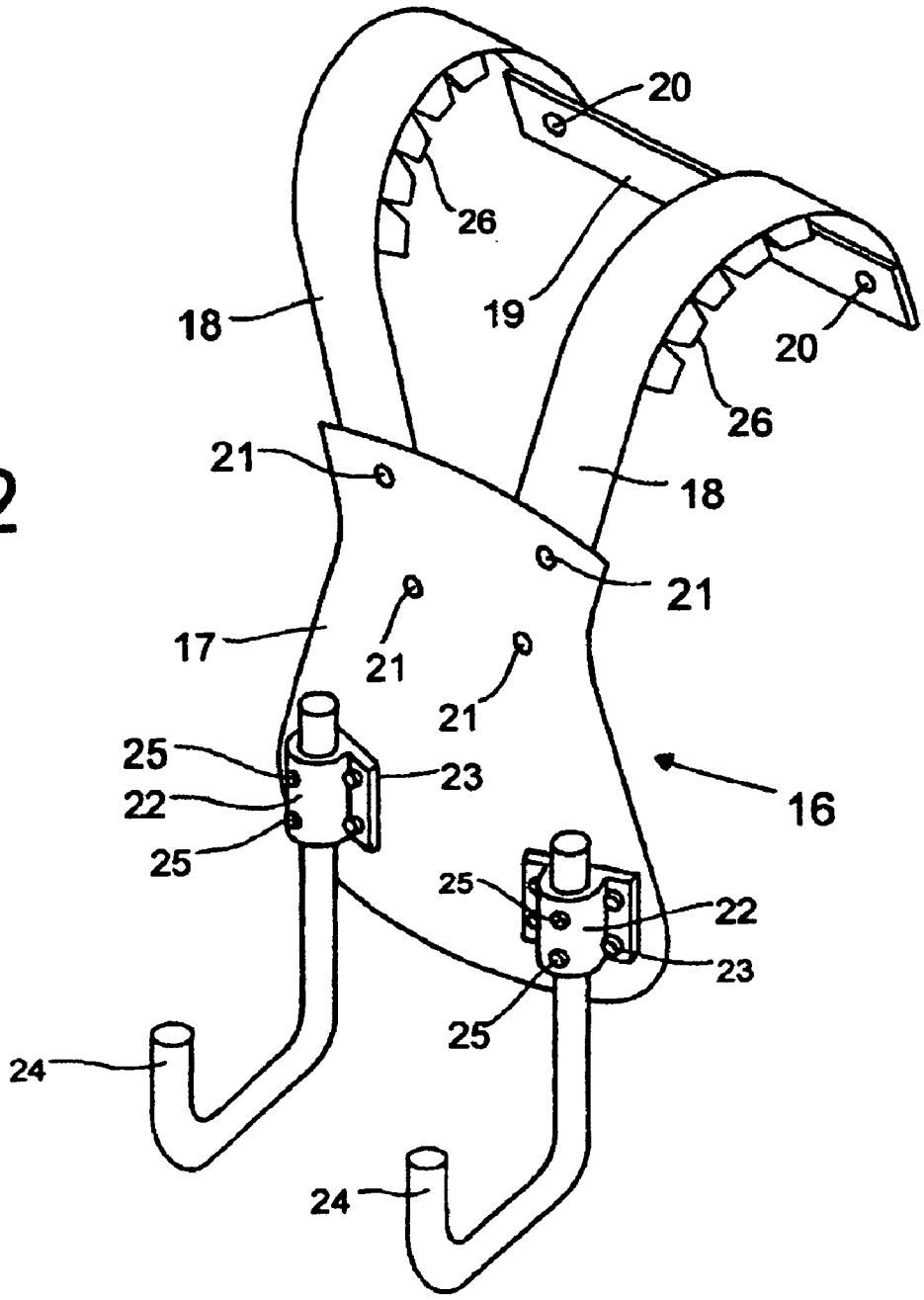
FIG. 2 is an isometric view of a supporting vest and J-bars for supporting marching drum assemblies as described below.
Figure 3:
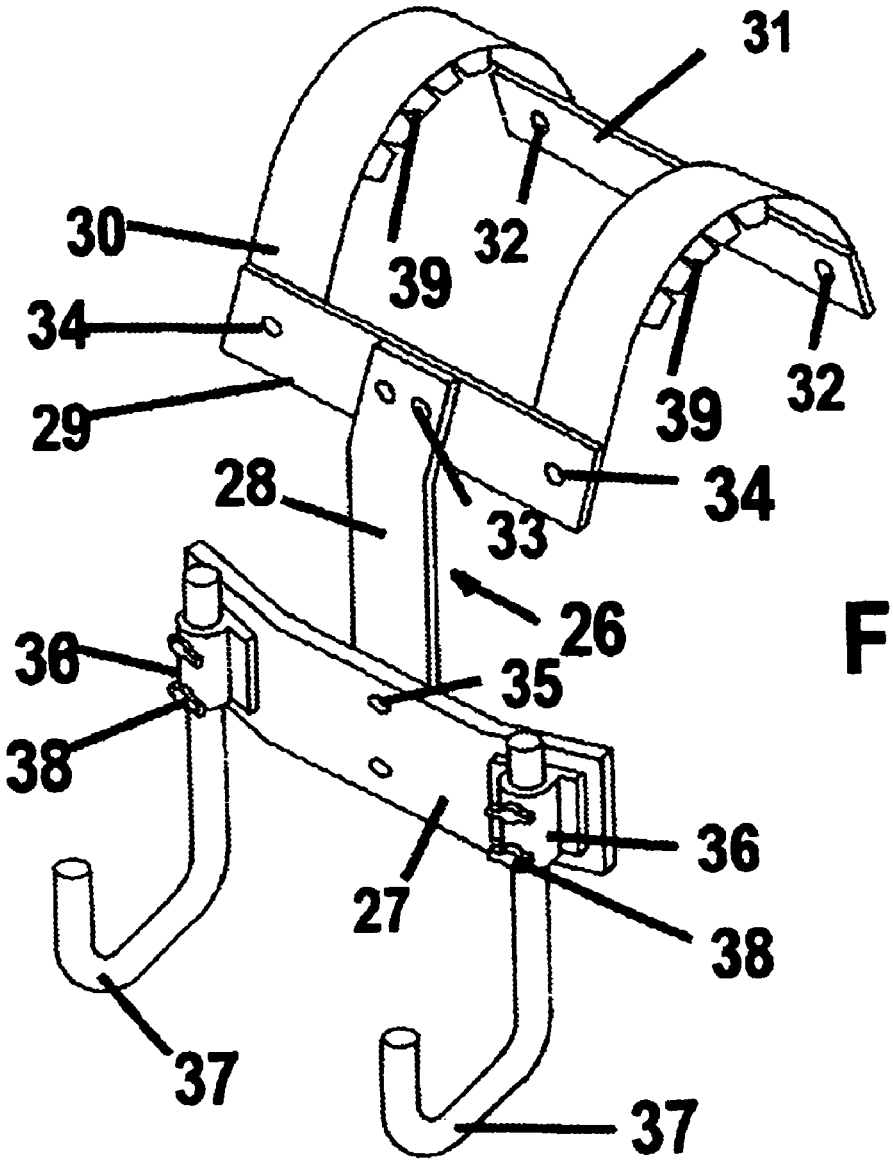
FIG. 3 is an isometric view of a novel T-bar assembly and J-rods for supporting drums containing features of the supporting vest of FIG. 2 for marching drums as described below.

FIGS. 1-3 illustrate prior art devices for supporting the drum hardware shown in FIGS. 4-9.

In FIG. 1, there is shown a drum support 10 comprising a vertically extending post 11 of a tripod (not shown) such as that shown in May U.S. Pat. No. 5,072,910. A bracket 12 has a center receptacle 13 supported on post 11 and side receptacles 14 that receive and support J-rods 15.

Referring to FIG. 2, there is shown a vest- or harness-type 16 carrier for percussion instruments which comprises a vest portion 17, shoulder straps 18 and back bar 19. Back bar 19 is removably secured to shoulder straps 18 by screws or bolts 20. Where desired, back bar 19 may be fixed as by welding or the like. Vest portion 17 is removably secured to shoulder straps 18 by screws or bolts 21 and has a pair of J-bar receptacles 22 secured by screws or bolts 23. J-bars 24 are supported in receptacles 22 and secured in position by T-bolts or set screws 25. J-bar receptacles may also be used of the type shown in FIGS. 38-41 and 51-55 of May U.S. Pat. No. 6,028,257. Shoulder straps 18 have pads 26 to cushion the load of the instruments carried by carrier 16. This carrier 16 is constructed and used as in May U.S. Pat. No. 5,691,492.

Referring to FIG. 3, there is shown a T-bar-type carrier 26 for percussion instruments which comprises a belly plate 27, vertical bar 28, upper horizontal bar 29, shoulder straps 30 and back bar 31. Back bar 31 is removably secured to shoulder straps 30 by screws or bolts 32. Where desired, back bar 31 may be fixed as by welding or the like. Upper horizontal bar 29 is removably secured to shoulder straps 30 by screws or bolts 34. Upper horizontal bar 29 is removably secured to the upper end of vertical bar 28 by screws or bolts 33.

Belly plate 27 is removably secured to the lower end of vertical bar 28 by screws or bolts 35. A pair of J-bar receptacles 36 are secured on belly plate 27 by screws or bolts or the like. J-bar receptacles may also be used of the type shown in FIGS. 38-41 and 51-55 of May U.S. Pat. No. 6,028,257. J-bars 37 are supported in receptacles 36 and secured in position by T-bolts 38. Shoulder straps 30 have pads 39 to cushion the load of the instruments carried by T-bar carrier 26. This carrier 26 is constructed and used as in May U.S. Pat. No. 5,691,492.

An Embodiment for Supporting Multiple Drum Assemblies

A hinge assembly 39 (FIGS. 4-6) is provided for supporting a multiple drum assembly or array 40 as used in marching bands. Hinge assembly 39 is similar in function to that shown in FIGS. 13-17 of May U.S. Pat. No. 6,028,257 with features permitting adjustability that is not possible in the embodiment of the patent. Multiple drum assembly or array 40 comprises a plurality, typically 2-6, of drums secured together for support and carrying by a drummer as in a marching band. In this embodiment, hinge assembly 39 provides a hinged support between the drum assembly 40 and a suitable marching carrier 16 or 26 as shown in FIGS. 2 and 3 or a fixed post support 11 as shown in FIG. 1.

Figure 4:
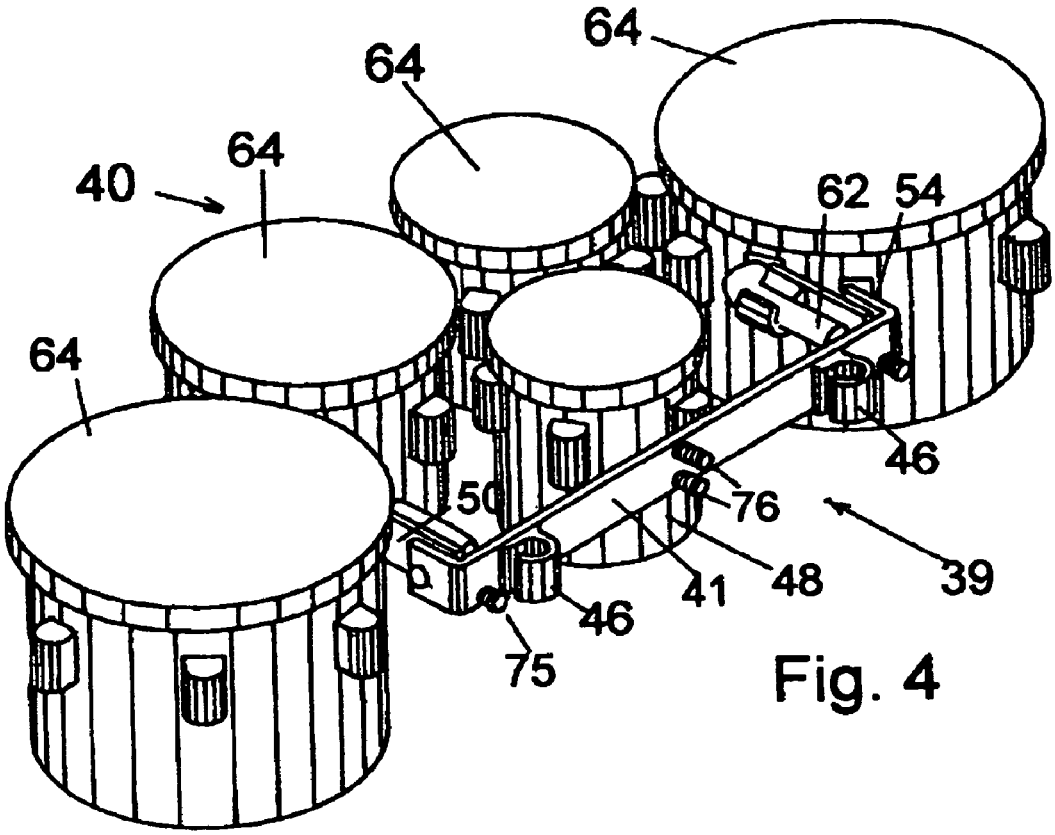
FIG. 4 is an isometric view of one embodiment of supporting hardware supporting an array of drums, as in a marching drum assembly.

Hinge assembly 39 (FIGS. 4-6) comprises a back bar 41 that is the fixed member of the hinge. Back bar 41 has end portions 42, bent at a right angle thereto, with holes 43 providing a pivot for the hinge. Holes 44 in each end of back bar 41 have bolts 45 inserted therethrough to secure J-rod receptacles 46 in place for supporting hinge assembly 39 on J-rods 15, 24, 37 on the supports shown in FIGS. 1-3. Holes 47 in back bar 41 provide for connection of one or more drums 48 (FIG. 4).

Figure 6:
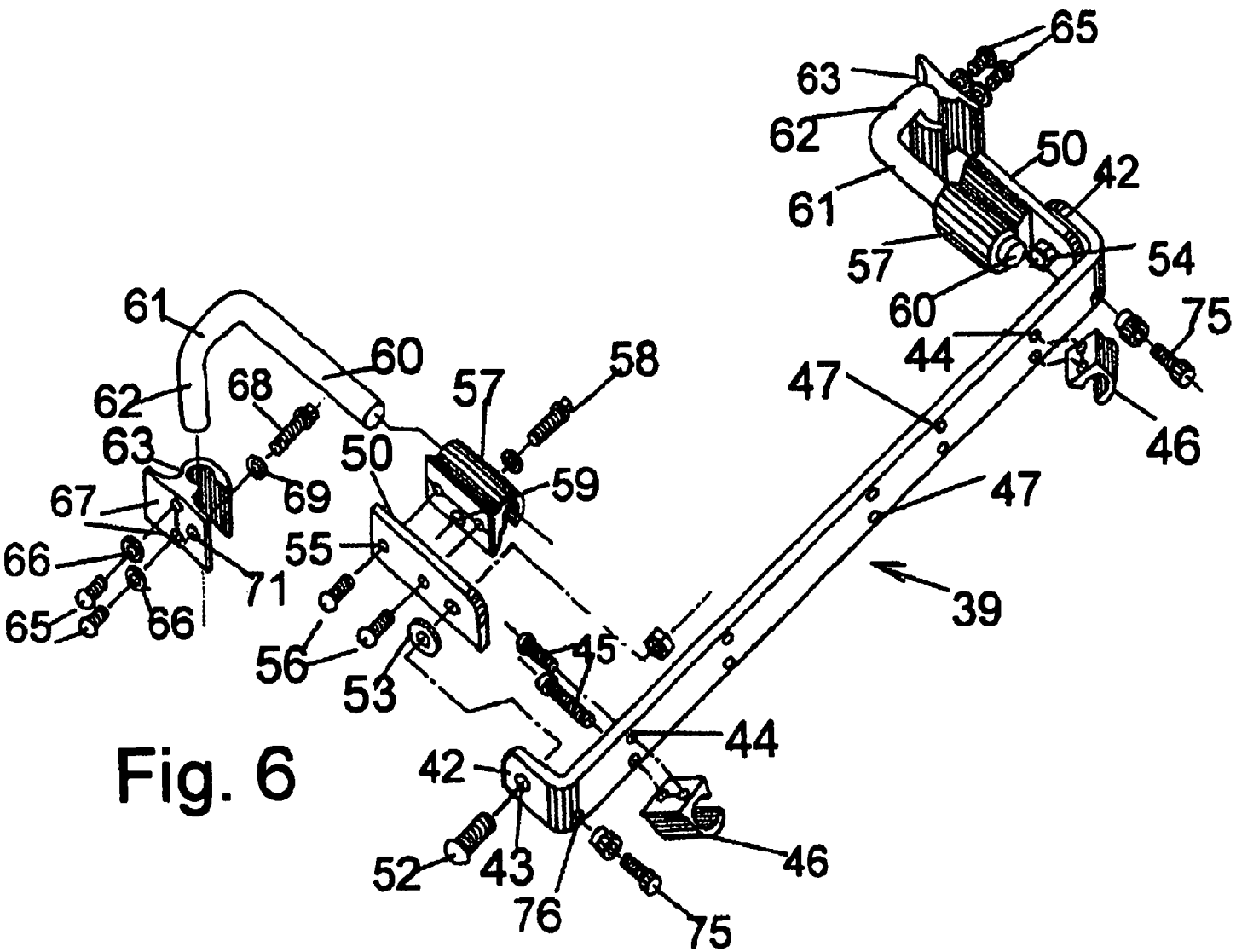
FIG. 6 is an exploded isometric view of the hinge for the drums and hardware of FIGS. 4 and 5.

In FIG. 6, the left side of the drawing shows the components in exploded relation while the right side shows them assembled. Hinge bars 50 are secured for rotation at each end of back bar 41 on bent end portions 42. Each hinge bar 50 has a hole 51 which receives bolt 52 extending through hole 43 and washer 53 and secured in place by nut 54. Each hinge bar 50 has a pair of holes 55 through which bolts 56 extend to secure clamping receptacle 57 thereon. Bolt 58 extends through receptacle 57 into hole 59 to tighten or loosen the clamp.

The end portion 60 of connecting rod 61 is secured in clamping receptacle 57. Another end portion 62 of connecting rod 61 fits into and is clamped by clamping receptacle 63 which is secured on one of the drums 64 of drum assembly 39. Drum 64 has holes that receive bolts 65 extending through washers 66 into holes 67 in the base of clamping receptacle 63. Bolt 68 extends through washer 69 and hole 70 in receptacle 63 into hole 71 to tighten or loosen the clamp. This clamping receptacle is available commercially and is described more completely in FIGS. 39-41, 47-49, and 52-55 of May U.S. Pat. No. 6,028,257.

Each hinge bar 50 is pivoted on bolts 52 to a selected position. Each hinge bar 50 has an end portion cut in curvature 72 permitting the edge to clear back bar 41. A set bolt 75 extends through hole threaded 76 in back bar 41 to engage the end portion 72 of hinge bar 50 to secure the hinge in a selected position.

In the assembly shown in FIG. 4, the array 40 of drums 64 are secured together and to hinge bars 50 for pivotal movement relative to drum 48 supported on the back bar. The clamping receptacles 57 are releasable to permit sliding adjustment of connecting rods 61 and the drum array 40 supported thereon inward and outward relative to back bar 41 and drum 48. The individual drums 64 of drum array 40 are preferable larger drums ranging about 8"-14" in diameter. Drum 48 on back bar 41 is preferably a smaller drum about 6" in diameter.

Operation

Figure 5:
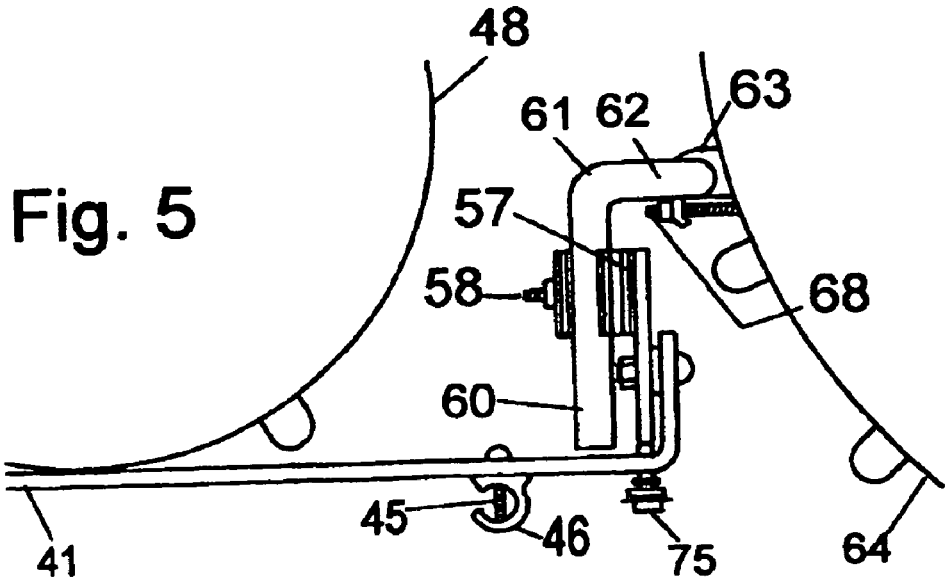
FIG. 5 is a top detail view of the hardware and a portion of the drums as shown in FIG. 4.

The operation of this supporting hardware should be apparent but will be described in some detail for clarity of understanding. Referring to FIGS. 4-6, the array of drums 40 is installed on J-rod clamps 63 as described above. The tenor drums 48 and 49 are secured on hinge back bar 41. In this position, the drum array 40 can be tilted relative to the drums 48 and 49 of hinge back bar 41. The connection of J-bar receptacle 57 permits the array of drums 40 to be adjusted inward and outward of the drums 48 and 49 on hinge back bar 47.

Another Hinge Assembly

Figure 7:
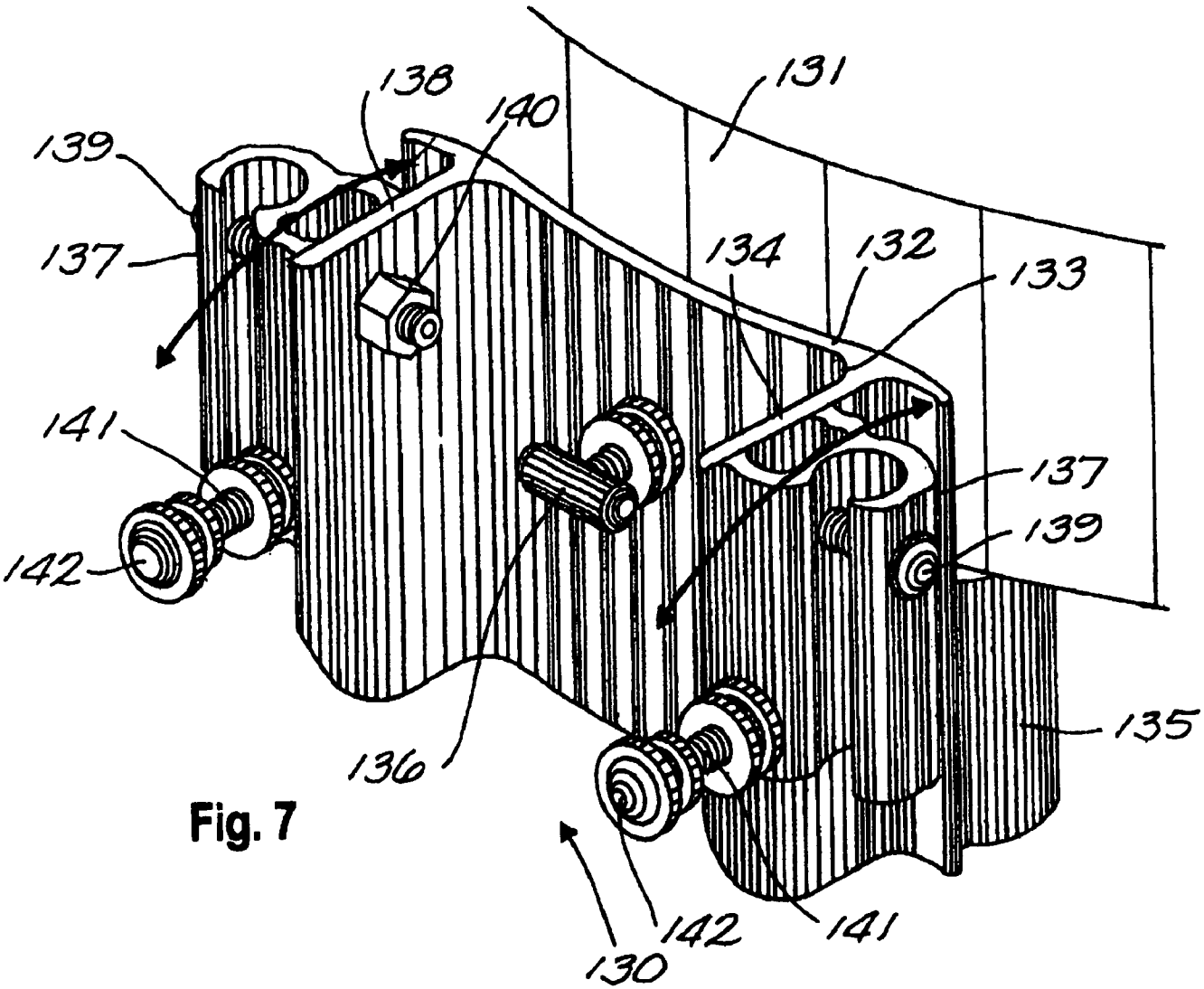
FIG. 7 is an isometric view of another embodiment of hinge secured on a drum shell.

Another hinge assembly is shown in FIG. 7 for connecting a drum to J-rods on a pedestal support or on a marching vest or T-bar carrier. Hinge assembly 130 is shown mounted on a drum 131 to allow pivoting of the drum on its support.

Figure 9:
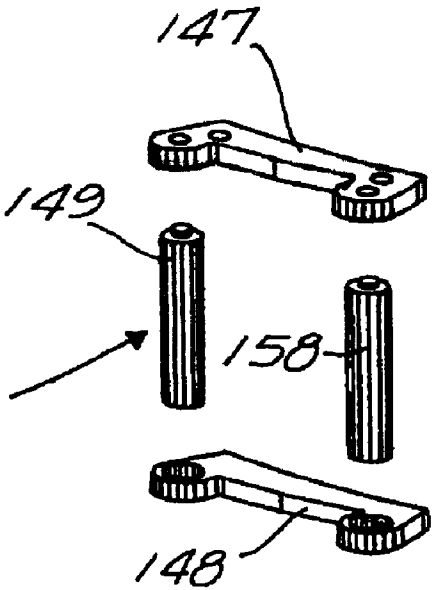
FIG. 9 is a detail, exploded view of the auxiliary supporting rods shown in FIG. 8.
Figure 8:
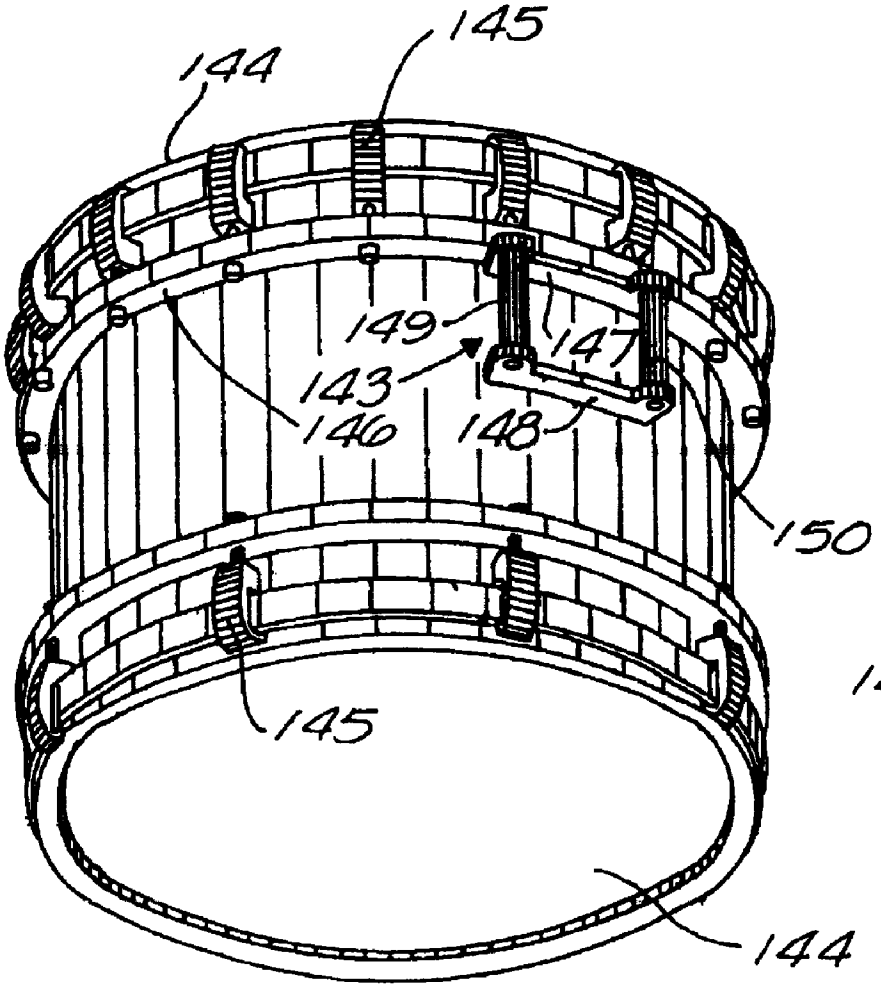
FIG. 8 is an isometric view of a drum shell having auxiliary rods supported thereon as supports for a hinge.

Hinge assembly 130 comprises a fixed member 132 that is a one-piece extrusion having a back portion 133 with parallel upstanding wall members 134 and rearward facing curved wall portions 135 that fit over two of the tension rods on the drum or rods 149 and 150 of the embodiment in FIGS. 8-9. Back portion 133 has a curvature allowing it to fit against drum 131. Thumbscrew 136 secures back portion 133 to the drum shell.

Two J-rod clamping receptacles 137 are supported for pivotal movement on sidewalls 134 of fixed hinge member 132. Receptacles 137 are cast or extruded and have an open edge portion which can flex to clamp J-rods or posts adjustably. Receptacles 137 have a cylindrical inner surface. The base 138 of receptacles 137 is hollow and maintains the receptacle in spaced relation to sidewalls 134 of fixed hinge member 132. Hinge bolts 139 extend through receptacles 137 into sidewalls 134 where they are secured by nuts 140. Bolts 141, operated by knobs 142, extend through the hollow base of receptacles 137 to engage wall 132 of fixed hinge member 130. Adjustment of bolts 141 pivots hinged receptacles 137 outward or inward to a selected position.

Operation

The operation of this supporting hardware should be apparent but will be described in some detail for clarity of understanding. Referring to FIG. 7, hinge assemble 130 is supported on drum 131 by clamping on the drum tension rods or rods 149 and 150 of the embodiment in FIGS. 8-9. Pivoted hinge receptacles 137 support the drum 131 on J-rods (not shown) on a supporting pedestal or on a marching carrier. Drum 131 is pivoted to a selected position by operation of knobs 142 on bolts 141 as described above.

Adaptor for Fastening Hinge to Drums

In FIG. 7, the hinge assembly is shown for attachment to tension rods on a drum 131. FIGS. 8 and 9 show an adaptor

143 to facilitate attachment to a drum that does not have tension rods extending from one side of the drum to the other. In this view, the drum has drumheads 144 on opposite sides secured by drum clamps 145 to rim 146. In this embodiment, adaptor 143 comprises spacer plates 147 and 148 securing rods 149 and 150 is spaced relation corresponding to the spacing of clamping walls 135 in the hinge of FIG. 7. Spacer plate 147 is secured to the ends of two adjacent bolts securing drum clamps 145 in place.

While this invention has been described fully and completely, with special emphasis on several preferred embodiments and/or applications, it should be understood that within the scope of the appended claims, the invention may be practiced otherwise than as specifically described.

What is claimed is:

1. Supporting hardware, for at least one drum including a drum shell, a pair of drum heads and drum hoops, for supporting said drum for pivotal movement on an external support, comprising:

a hinge comprising a fixed supporting plate including means for supporting said drum-supporting hardware on said external support, a pair of movable hinge plates positioned adjacent to said fixed supporting plate, and a hinge pin interconnecting said supporting plate and said hinge plates for pivotal movement of said hinge plates on said supporting plate, said movable hinge plates having means for connection to an external support on said drum to clamp said drum on one of said hinge plates, and means adapted to be secured on supporting rods on said drum interconnecting said hinge plate with said drum.

2. Supporting hardware for at least one drum according to claim 1 in which:

said rods are two adjacent tension rods on the drum.

3. Supporting hardware for at least one drum according to claim 1 in which:

said rods are rod members supported on said drum shell in said drum not having tension rods or connecting rods extending between [tire] *the* drum-heads.

4. Supporting hardware for at least one drum according to claim 1 in which:

said fixed supporting plate has hollow receptacles for connection to said rods, and said movable hinge plates have hollow receptacles for connection to J-rods supported by and extending from the external support.

*5. Supporting hardware, for at least one drum including a drum head and drum hoop, for supporting such drum for pivotal movement on an external support, comprising:*

*a hinge comprising a supporting member including means for supporting said drum supporting hardware on said external support,*

*said support member having adjustment means for horizontal towards and away movement of said drum supporting hardware on said external support, and*

*a hinge member positioned adjacent to said supporting member.*

*6. Supporting hardware for a drum according to claim 5 in which:*

*said drum has at least one rod secured thereon, and said drum securing means is secured to said rod.*

*7. Supporting hardware for a drum according to claim 6 having two adjacent rods on the drum.*

*8. Supporting hardware for a drum according to claim 7 in which:*

*said rods are supported on a drum not having tension rods or connecting rods extending between the drum-heads.*

*9. Supporting hardware for a drum according to claim 6 in which: one of said hinge members has a hollow receptacle for connection to one rod, and*

*another of said hinge members has a hollow receptacle for connection to a J-rod supported by and extending from the external support.*

*10. Supporting hardware for drums according to claim 5 in which: said hinge comprises a fixed supporting plate with end portions bent at a right angle thereto,*

*means on said supporting plate for supporting said drum-supporting hardware on said external support,*

*a pair of hinge plates positioned adjacent to the bent end portions of said fixed supporting plate,*

*and a hinge pin interconnecting said bent end portions and said hinge plates,*

*said hinge plates having means for connection to an external support on a drum to secure such drum on one of said hinge plates, and*

*said external support on said drum comprising a rod interconnecting said hinge plate with said drum.*

*11. Supporting hardware for drums according to claim 10 including:*

*two adjacent tension rods or connecting rods on the drum.*

*12. Supporting hardware for drums according to claim 10 including:*

*said rods are supported on a drum not having tension rods or connecting rods extending between the top and bottom of the drum.*

*13. Supporting hardware for drums according to claim 10 in which:*

*said fixed supporting plate has hollow receptacles for connection to J-rods supported by and extending from the external support, and*

*said movable hinge plates have hollow receptacles for connection to rods on said drum.*

*14. Supporting hardware for drums according to claim 5 in which:*

*said hinge comprises a supporting plate with end portions bent at a right angle thereto,*

*means on said supporting plate for supporting said drum-supporting hardware on a drum,*

*a pair of hinge plates positioned adjacent to the bent end portions of said fixed supporting plate,*

*a hinge pin interconnecting said bent end portions and said hinge plates, and*

*said hinge plates including means for supporting said drum-supporting hardware on a plurality of drums.*

*15. Supporting hardware for drums according to claim 14 in which:*

*each said hinge plate includes a hollow receptacle for connection to a J-rod supported by and extending from the external support.*

*16. Supporting hardware for drums according to claim 15 in which:*

*at least one of said hinge plates includes a thumbscrew operable to engage said supporting plate for pivotal adjustment of said drum.*

*17. Supporting hardware for a drum, comprising:*

*drum attachment hardware for a drum that does not penetrate into or through the drum shell to secure to at least one drum, where the hardware further includes;*

*a hinge member positioned adjacent to said attachment hardware;*

*a hinge pin interconnecting said attachment hardware and said hinge member with at least one receptacle for*

*attaching the hinge member to a shoulder supported carrier to allow the drum attachment hardware to rotate relative to the at least one receptacle.*

*18. The supporting hardware for a drum from claim 17 wherein the drum attachment hardware is with fastening means for securing the hardware to at least one tension rods and or tubes and or bars on a drum.*

*19. The supporting hardware for a drum from claim 17 wherein the drum attachment hardware is with fastening means that clamps to at least one of the drums one tension rods and or tubes and or bars on a drum.*

*20. The supporting hardware for a drum from claim 17 wherein the drum attachment hardware is with fasteners that secure the hardware onto the drum rim and or hoop.*

* * * * *